UNITED STATES PATENT OFFICE.

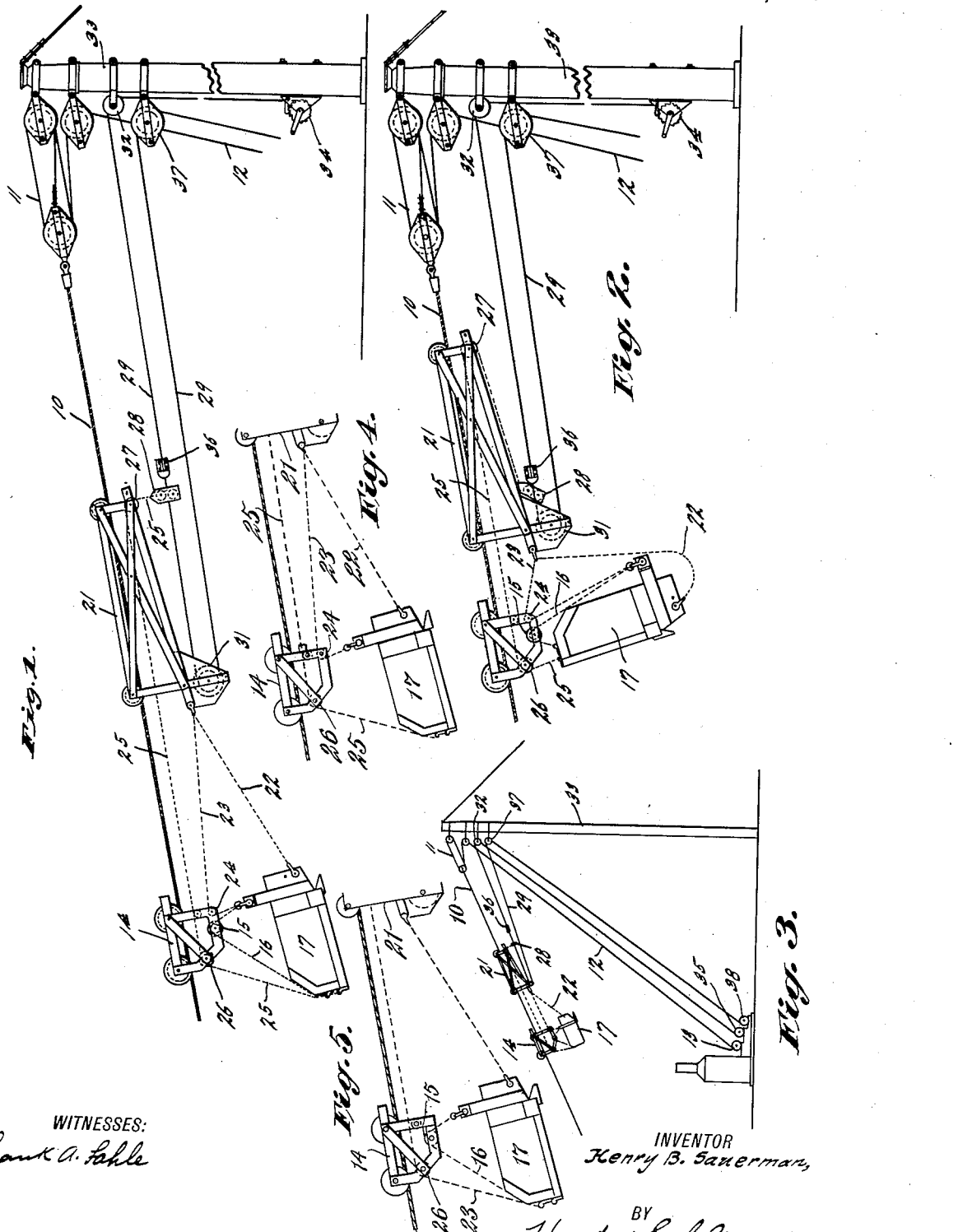

HENRY B. SAUERMAN, OF CHICAGO, ILLINOIS, ASSIGNOR OF ONE-HALF TO JESSE A. SHEARER, OF INDIANAPOLIS, INDIANA.

DRAG-LINE EXCAVATOR.

1,171,893.      Specification of Letters Patent.    Patented Feb. 15, 1916.

Application filed July 26, 1915. Serial No. 41,841.

*To all whom it may concern:*

Be it known that I, HENRY B. SAUERMAN, a citizen of the United States, residing at Chicago, in the county of Cook and State of Illinois, have invented a new and useful Drag-Line Excavator, of which the following is a specification.

The object of my invention is to produce an apparatus for excavating, transporting and dumping material, the apparatus being controllable from a single point by one operator, and the dumping operation being at all times within the easy control of the operator both as to point of dump and control of the dumping action.

The accompanying drawings illustrate my invention.

Figure 1 is an elevation of an apparatus embodying my invention, with the parts near the dumping position; Fig. 2 a similar view showing the parts in dumped position; Fig. 3 a similar view on a smaller scale showing a slight modification in the manner of mounting the drag line; and Figs. 4 and 5 details of slight modifications in the connection of the drag line with the bucket.

In the drawings, 10 indicates a track cable which may be raised and lowered, by tightening and slackening, so as to vary its height relative to the point of excavation, this operation being most conveniently accomplished by means of a tackle 11, cable 12 of which is extended to a suitable winding drum, as, for instance, the power driven drum 13. The opposite end of the cable 10 is supported in the usual manner at a lower point by anchoring to a dead man. Mounted upon the track 10 is a bucket carriage 14 carrying an idler 15 over which is extended a cable 16, the opposite ends attached to the front and rear ends of the excavator or scraper bucket 17. Also slidably mounted upon the track 10 is a second carriage 21 which is connected to the forward end of the bucket 17, near its lower corner, by a cable or bridle 22. Also connected to carriage 21 is a cable 23 which is extended rearwardly to carriage 14 and passed from thence downwardly over an idler 24 to the forward end of bucket 17. The weight of the forward end of the bucket may be carried by the cable 23 without cable 16, as shown in Fig. 4, or the cable 23 may be omitted and the weight of the forward end of the bucket carried by cables 16 and 22, as shown in Fig. 5, but the arrangement shown in Fig. 1 is, in my opinion, the most satisfactory and efficient.

Attached to the rear end of bucket 17 is a dumping cable 25 which is passed upwardly and forwardly over an idler 26 mounted in carriage 14 and from thence forwardly and downwardly over an idler 27 arranged at the forward end of carriage 21. The lower forward end of the dumping cable 25 carries an eye block 28 through which the drag line 29 is passed. This drag line 29, instead of being single, as is the case in most devices of the general type to which this invention belongs, is doubled substantially parallel with the track 10, its bight passing around an idler 31 mounted in the carriage 21 arranged preferably near the rear end of said carriage at a point closely approximating the point of attachment of cables 22 and 23 to said carriage and Figs. 4 and 5 details of slight modifications in the connection of the drag line with the bucket. The anchor end of drag line 29 is carried over an idler 32 arranged near the upper end of the usual mast 33 and is passed from thence either to a hand-operated winding drum 34 at the foot of the mast or to a power-controlled drum 35 (Fig. 3). This anchor end of the drag line is provided with a stop button 36 adapted to be engaged by the eye block 28. The active end of the drag line 29 is passed over an idler 37 carried at the end of the mast 33 and from thence downwardly to a power-controlled winding drum 38.

The track 10 is so mounted that at times it may be steeply inclined away from the mast 33 (toward the left in the drawings) to such an extent that the two carriers 14 and 21 will move downwardly along the track by gravity when the active end of the drag line 29 is released and when that occurs, the bucket 17 either by reason of its own weight or by coming into contact with the ground or water at the point of excavation, will be automatically righted into the position shown in Figs. 1 and 3. When the active end of the drag line is wound upon its drum, an excavating pull will be exerted upon the scraper bucket 17 so as to cause it to be filled. Thereupon the track 10 will be raised so as to raise the filled bucket from the point of excavation. Continued forward pull upon the drag line 29 will serve to advance the carriers 21 and 14 upon the track 10 until finally the eye block 28 comes into contact with a button 41 which is attached to the anchor end of the drag line and the position of which lengthwise of the cable 10 may be controlled by rotation of the drum 34 or 35. When this position of the parts is reached, continued forward pull upon the active end of the drag line 29 causes the button 41 to operate against the eye block 28 so as to pull forward upon the dumping cable 25 at a speed double that of the forward movement of carriage 21, resulting from the forward pull on the active end of cable 29, and, consequently, the rear end of the bucket 17 is not only drawn upwardly, but, because of the advancement of carriage 14 relative to carriage 21, there is a slacking of cables 22 and 23 and a consequent lowering of the forward end of the buckets 17. This dumping action of the bucket may be arrested at any point or decreased in speed by stopping, or decreasing the speed of, the active end of the drag line 29.

As already stated, the position of button 36 relative to the length of the track 10 may be readily varied thus controlling the point at which the dumping operation is to take place, and it will be immediately apparent that the dumping operation may take place at either side of the point of excavation. If a dumping operation is desired at a point to the rear of the excavation point, the track 10 will first be slacked sufficient to lower the bucket to the excavation point and forward pull upon the active end of the drag line be exerted to accomplish the dredging or scraping operation. The track 10 will then be tightened and both ends of the drag line be released so that both parts will move rearwardly with the carriage 21 and carriage 13 under the action of gravity, until the button 36 reaches the point of desired dumping, whereupon the anchor end of the drag line 29 will be held and forward pull exerted upon the active end of the drag line, whereupon dumping action, in the manner already described, will be accomplished.

I claim as my invention:

1. An excavator comprising a track, a carriage slidably mounted on the track, an excavator bucket mounted on the carriage, a second carriage slidably mounted on the track, a drag line acting upon the second carriage, a dumping cable extended from the excavator bucket over a portion of the first carriage and over a portion of the second carriage, means for exerting a pull upon the forward end of the excavator bucket, and a stop-block arranged to act upon the dumping cable to dump the bucket by continued forward pull upon the drag line.

2. An excavator comprising a track, a carriage slidably mounted on the track, an excavator bucket mounted on the carriage, a second carriage slidably mounted on the track, a drag line acting upon the second carriage, a dumping cable extended from the excavator bucket and over a portion of the second carriage, means for exerting a pull upon the forward end of the excavator bucket, and a stop-block arranged to act upon the dumping cable to dump the bucket by continued forward pull upon the drag line.

3. An excavator comprising a track, a carriage slidably mounted on the track, an excavator bucket, a second carriage slidably mounted on the track, a cable extending from said second carriage to the first carriage and thence downwardly to the forward end of the bucket, a dumping cable extending from the rear end of the bucket and thence upwardly over a portion of the first carriage and thence forwardly over a portion of the second carriage, a connection between the forward end of the bucket and the second carriage, a drag line, the bight of which is passed over a portion of the second carriage, a stop button carried by the drag line, and means carried by the dumping cable for engagement by said stop button.

4. An excavator comprising a track, a carriage slidably mounted on the track, an excavator bucket, a suspending cable for said bucket attached to its forward and rear ends and passed over a portion of the carriage, a second carriage, a cable attached to said second carriage and passed over a portion of the first carriage and thence downwardly to a point of attachment at the forward end of the bucket, a drag connection between said second carriage and the forward end of the bucket, a dumping cable attached to the rear end of the bucket and passed upwardly over a portion of the first carriage and thence over a portion of the second carriage, a drag cable connected with the first carriage, and a stop block arranged to act upon the dumping cable to dump the bucket by continued forward pull upon the drag line.

5. An excavator comprising a track, a carriage slidably mounted on the track, an excavator bucket, a suspending cable for said bucket attached to its forward and rear ends and passed over a portion of the carriage, a second carriage, a cable attached to said second carriage and passed over a portion of the first carriage and thence downwardly to a point of attachment at the forward end of the bucket, a drag connection between said second carriage and the forward end of the bucket, a dumping cable attached to the rear end of the bucket and passed upwardly over a portion of the first carriage and thence over a portion of the second carriage, a drag line the bight of which is passed around a portion of the second carriage, and a stop block carried by said drag line and arranged to act upon the dumping cable to dump the bucket by continued forward pull upon the active end of the drag line.

6. An excavator comprising a track, a carriage movable on said track, a bucket carriage movable with and relative to the first-mentioned carriage in the line of movement thereof, an excavator bucket swingably mounted upon said bucket carriage, a drag line having its bight passed around a portion of the first-mentioned carriage, connections between the first-mentioned carriage and the bucket carriage to partake of the forward movement of the first-mentioned carriage, and interengaging means between the drag line and bucket carriage for causing movement of the bucket carriage forwardly on the first-mentioned carriage to produce dumping of the bucket.

7. An excavator comprising a track, a carriage movable on said track, a bucket carriage movable with and relative to the first-mentioned carriage in the line of movement thereof, an excavator bucket swingably mounted upon said bucket carriage, means for drawing the first-mentioned carriage along the track, and means operating upon the bucket carriage by continued forward movement of the first-mentioned carriage for shifting the bucket carriage relative to the first-mentioned carriage and causing a dumping operation of the bucket.

8. An excavator comprising a track, a carriage slidably mounted on the track, a doubled drag line the bight of which is passed around a portion of the carriage, an anchor for one end of said line, a stop button on the anchored end of said drag line, means by which the position of said stop button may be varied longitudinally of the track, a bucket, means for supporting said bucket for movement along the track and means connected with the bucket and engageable by said stop button for producing a dumping operation of said bucket.

In witness whereof, I have hereunto set my hand at Chicago, Illinois.

HENRY B. SAUERMAN.